HIGH-FREQUENCY DECADE COUNTING SYSTEM EMPLOYING GATING NETWORK RESPONSIVE TO ALL COUNTING STAGES
Filed June 25, 1962
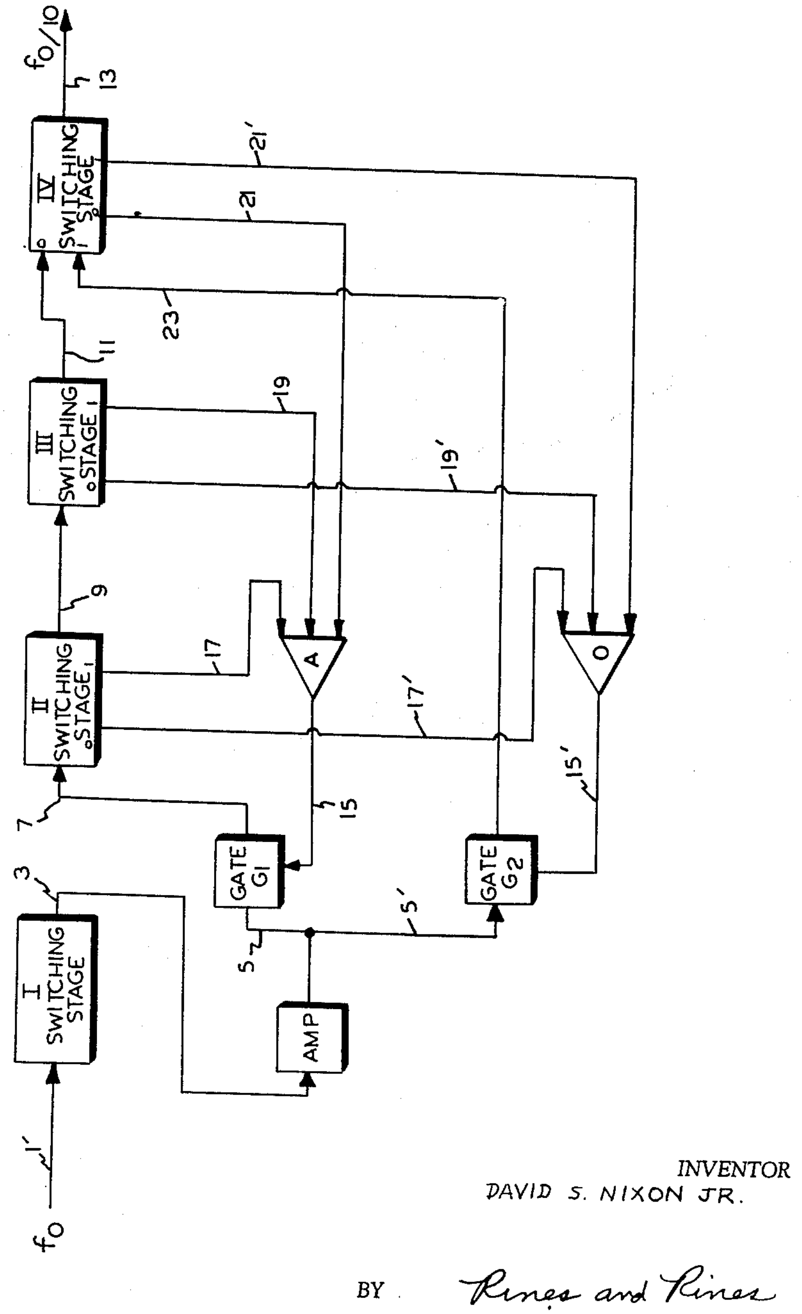
INVENTOR
DAVID S. NIXON JR.
BY Rines and Rines
ATTORNEYS 3,156,870

HIGH-FREQUENCY DECADE COUNTING SYSTEM EMPLOYING GATING NETWORK RESPONSIVE TO ALL COUNTING STAGES

David S. Nixon, Jr., Bedford, Mass., assignor to General Radio Company, West Concord, Mass., a corporation of Massachusetts Filed June 25, 1962, Ser. No. 204,943
20 Claims. (Cl. 328—45)

The present invention relates to counters of the type employing switching stages, such as flip-flop or multi-vibrator types of electronic relay-operated stages and the like; and, more particularly, to decade counting circuits that are adapted for high-frequency operation.

Prior-art high-speed decade counting circuits of the above-described character, such as are described, for example, in the General Radio Experimeter of May 1961, vol. 35, No. 5, have been subject to certain inherent limitations in speed of operation resulting from the requirement that, preparatory to effecting certain successive counting sequences, the counter must be placed in condition for the occurrence of a certain state of operation. Delays inherent in causing one or more switching stages to be triggered by an impulse resulting from a preceding stage or other circuit, introduce such counting-speed limitations.

An object of the present invention, accordingly, is to provide a new and improved decade counter that shall not be subject to the disadvantages above-discussed, but that, to the contrary, shall provide a much more rapid speed of operation absent in the inherent delays of prior-art counting circuits.

A further object is to provide a novel counting circuit of more general utility, as well.

Other and further objects will be explained hereinafter and will be more particularly pointed out in connection with the appended claims.

In summary, from one broad point of view, the invention relates to a counter circuit having, in combination, three serially connected switching stages and a fourth switching stage to which signal impulses-to-be counted may be fed. A gating system is connected with the fourth switching stage to trigger the three serially connected switching stages through the gating system, with the latter responsive to output signals applied thereto from each of the three serially connected switching stages. Further details are hereinafter set forth.

The invention will now be described in connection with the accompanying drawing, the single figure of which is a schematic block circuit diagram illustrating the invention in the preferred form. Referring to the drawing, there is shown a decade counter comprising four switching stages respectively numbered I, II, III, and IV, serially connected to provide, for example, a high-frequency counting system. Signal impulses, represented by the symbol *fo* and applied at 1' to the input of the first switching stage I, may be counted up to a rate corresponding, for example, to fifty megacycles frequency, more or less. The switching stages may be of the flip-flop variety as described, for example, in the said General Radio Experimenter, or they may be of any other bistable type.

The output of the first switching stage I is shown connected by a conductor 3 through an amplifier, labeled "AMP," not necessary insofar as the logic sequence of the system is concerned, and by way of a further conductor 5 to an input of a first gating or gate circuit or device $G_1$, which may, for example, be of the type described in Semiconductor Devices and Applications, R. A. Greiner, McGraw-Hill Book Company, Inc., pp. 373–384, and Transistor Circuit Engineering, R. F. Shea, John Wiley & Sons, pp. 318–320. The output of the gate $G_1$ is shown fed by conductor 7 to the input of the second switching stage II, so that a serial connection is provided between the output 3 of the stage I and the input circuit of the stage II through the gate device $G_1$ when $G_1$ is open. The output of the switching stage II, in turn, is shown connected by the serial connection 9 to the input of the switching stage III, with the output of the latter serially connected by conductor 11 to an input of the switching stage IV. The output of the switching stage IV provides at 13 a divided total count output, represented by the symbol *fo*/10 for a division factor of ten.

In accordance with the invention, the gate $G_1$ is controlled by a coincidence circuit, illustrated as an "And" circuit A, the output of which is connected to the gate by conductor 15, and the input of which requires the presence of certain specified outputs from each of the switching stages II, III and IV. One of the pair of flip-flop switching stage outputs, labeled "1," in each of the switching stages II and III is connected by respective conductors 17 and 19 to the "And" circuit A, which may be the type described, for example, in the above-mentioned texts. The further coincidence signal required for the operation of the "And" circuit A is provided by connecting the "0"-output of the fourth switching stage IV, by means of conductor 21, to the coincidence circuit A. When this predetermined set of outputs from the switching circuits, in the order IV, III and then II, is applied to the "And" circuit A, that circuit will be caused to close the gate $G_1$ as will hereinafter be described.

In similar fashion, the output of the switching stage I feeds from the amplifier "AMP," by way of gate $G_2$ and conductor 23 to the "1" input of the fourth switching stage IV. The gate $G_2$ is controlled by the output fed along conductor 15' from a further coincidence circuit O, illustrated as of the "or" type, as described, for example, in the Greiner and Shea texts, above-referenced. The "or" coincidence circuit O is shown operated by a set of outputs from each of the switching stages II, III and IV, that is complementary to the "1," "1," "0" outputs fed to the "And" circuit A. Specifically, the "0" output of the stage II is shown applied by conductor 17' to the input of the coincidence circuit O; the "0"-output of the switching stage III is similarly shown applied by the conductor 19' to the input of the circuit O; and the "1"-output of the switching stage IV is applied by conductor 21' to the input of the circuit O. It will thus be observed that, in the illustrated example, the inputs to the coincidence circuit O are complementary to the inputs to the coincidence circuit A; so that the opening of the gate $G_1$ will automatically effect closing of the gate $G_2$, while the closing of the gate $G_1$ will effect the opening of the gate $G_2$ for reasons subsequently made more apparent.

In the illustrated example, the following code is preferred, bearing the weighting factors of 1, 2, 4 and 2, as is well known, and having the following preferred sequence of operation:

| Decade Switching Unit | I | II | III | IV |
|---|---|---|---|---|
| Weighting Factor | 1 | 2 | 4 | 2 |
| Signal Impulse No.: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 1 | 1 | 1 |
| 9 | 1 | 1 | 1 | 1 |

From this table, it will be evident that the application of the first impulse at the input 1′ of the first switching stage I sets the first stage I to the complementary "1" position, whereas the stages II, III and IV are at the "0" state. Since the first column is given a weighting factor of 1, this corresponds to the first impulse count. The next impulse causes complementing of the switching stage I to the "0" state, so that there will be applied through the open gate $G_1$ by way of amplifier "AMP" and conductors 5 and 7, a trigger signal for the switching stage II that causes it to complement to state "1," while the stages III and IV remain in the "0" state. Since the second column has a weighting factor of 2, the existence of the "1" state in the switching stage II corresponds to a number 2 in the count. When the third impulse comes, the first switching stage I is again complemented so that it assumes the "1" state and switching stage II remains in state "1." In view of the respective weighting factors 1 and 2 for the stages I and II, respectively, a total count of 3 is provided, corresponding to the third impulse.

The next impulse causes complementing of the stages I and II to the "0"-state, and, by means of the serial connection 9, complementing of the switching stage III to the state "1." Since there is a weighting factor of 4 associated with the stage III, this means a unit count of 4 has been effected. The next impulse, in turn, causes complementing of the switching stage I from the "0" to the "1" state, which, in combination with the weighting factor 1 therefor, and the weighting factor 4 for the "1" state of the switching stage III, provides a count of 5.

The following impulse effects complementing of the first switching stage I to the "0" state and, through the gate $G_1$, complementing of the switching stage II to the "1" state, and thus providing, by means of the weighting factors 2 and 4 for the respective stages II and III, a count of 6.

It will be observed that switching stage IV is in the "0" state during counts zero through 6 and this provides one of the inputs to coincidence circuit A. At the count of 4, switching stage III is placed in the "1" state and this provides a second input to coincidence circuit A. At the count of 6, switching circuit II is placed in the "1" state and this provides the third input to coincidence circuit A, which causes a signal to be applied by means of connection 15 to $G_1$ causing $G_1$ to close. This also removes the third input to coincidence circuit O, which causes no signal to be applied to $G_2$, allowing $G_2$ to open. It is this series of events that sequentially removes the inputs from the coincidence circuit O. This sequence of events achieves the opening and closing of the gates with minimum delay.

Upon the advent of the next or seventh impulse at the switching stage I, which complements the same, as shown in the horizontal column opposite the seventh signal impulse in the above table, the stages II, III, and IV remain in their present "1," "1," "0" conditions.

The eighth impulse will complement the first stage I back to the "0" state, but now feeds its impulse through the open gate $G_2$ by way of conductor 23 to the switching stage IV, setting the same to the "1" state. With switching stage IV now in the "1" state, the input to the coincidence circuit A through conductor 21 is removed and $G_1$ is allowed to open. $G_2$ is thus closed by the application of a signal to coincidence circuit O through conductor 21′.

The ninth impulse will complement the first stage I back to the "1" state leaving stages II, III and IV in the 1, 1, 1 state.

The tenth impulse will complement the first stage I back to the "0" state which creates an impulse that feeds through $G_1$ and complements stage II to the "0" state. The complementing of stage II to the "0" state creates a pulse which complements stage III to the "0" state, again creating an output pulse that is fed to stage IV to set stage IV to the "0" state. The setting of stage IV to the "0" state creates the output pulse from the decade counter.

It will be observed that each of the gating systems or circuits comprising the devices $G_1$ and $G_2$ and associated coincidence circuits A or O, are complementarily operated so that when one is open, the other is closed; or when one is closed, the other is open. High-speed operation is attained through the operation of each of the gating systems in response, however, to a signal resulting from the direct feeding of an impulse from the first switching I stage to the switching stage that is directly connected to the output of the gate $G_1$ or $G_2$. Thus, while the gate $G_1$ is actuated in response to the signals sent by conductors 19 and 21 from the switching stages III and IV, the time of closing is controlled promptly upon the application of the "1" output from the switching stage II along conductor 17, resulting from the feeding of an input signal directly from the gate $G_1$ to the input 7 of the switching stage II. Similar minimum-delay operation occurs with regard to the gate $G_2$, which, though there is a conditioning application of the "0" and "1" signals from the switching stages III and IV, by way of conductors 19′ and 21′, is actuated at the time that the "1" output occurs from the switching stage IV as a result of an impulse fed from the gate $G_2$ directly to actuate the switching stage IV.

A material increase in the counting speed is achieved by this system, and it is not subject to the delays and conditioning requirements of the prior-art counters of this character. The inherent low propagation time for gating, moreover, is also useful for other types of similar circuits and with other code sequences than the preferred sequence above given. Modifications will occur to those skilled in the art and all such are considered to fall within the spirit and scope of the present invention.

What is claimed is:

1. A counter having, in combination, three serially connected switching stages, a further switching stage to which signal impulses-to-be-counted may be fed, a gating system connected with the further switching stage to trigger the three serially connected switching stages through the gating system, the gating system being responsive to output signals applied thereto from each of the three serially connected switching stages.

2. A counter having, in combination, three serially connected switching stages, a further switching stage to which signal impulses-to-be-counted may be fed, a gating system connected with the further switching stage to trigger the three serially connected switching stages through the gating system, the gating system being responsive to output signals applied thereto from each of the three serially connected switching stages, but operated at the time of application thereto of an output signal derived from a predetermined one of the said three stages and initiated by a signal impulse applied to such predetermined switching stage from the gating system.

3. A counter having, in combination, three serially connected switching stages, a further switching stage to which signal impulses-to-be-counted may be fed, a pair of gating circuits connected with the further switching stage to trigger the three serially connected switching stages through the gating circuits, each gating circuit being responsive to output signals derived from each of the three serially connected switching stages.

4. A counter having, in combination, three serially connected switching stages, a further switching stage to which signal impulses-to-be-counted may be fed, a pair of gating circuits connected with the further switching stage to trigger the three serially connected switching stages through the gating circuits, each gating circuit being responsive to output signals derived from each of the three serially connected switching stages, with each closing at the time of application thereto of an output signal derived from a different predetermined one of the said three switching stages and initiated by a signal impulse applied to such predetermined switching stage directly from the corresponding gating circuit.

5. In a counting circuit, first and second switching stages each having an input and an output, means for applying signal impulses-to-be-counted to the input of each of the first and second switching stages, said means including a gating circuit for each of the stages, and a pair of circuit connections, one between each of the first and second switching stages and its corresponding gating circuit, for reversing the state of operation of such gating circuit in response to the production of a signal in the said output of each of the first and second switching stages effected by the application of a signal impulse through the corresponding gating circuit to the corresponding switching stage input.

6. A circuit as claimed in claim 5 and in which the operation of each of the gating circuits corresponding to the first and second switching stages is also dependent upon the application thereto of a signal from the non-corresponding switching stage.

7. In a counting circuit, first and second switching stages each having an input and an output, a further switching stage for applying signal impulses-to-be-counted to the input of each of the first and second switching stages, a pair of gating circuits, one connected between each of the first and second switching stages and the further switching stage through which the signal impulses are applied from the further switching stage to the input of the corresponding one of the first and second switching stages, and a pair of circuit connections, one between each of the first and second switching stages and its corresponding gating circuit, for reversing the state of operation of such gating circuit in response to the production of a signal in the said output of each of the first and second switching stages effected by the application of a signal impulse from the further switching stage through the corresponding gating circuit to the corresponding switching stage input.

8. A circuit as claimed in claim 7 and in which the operation of each of the gating circuits corresponding to the first and second switching stages is also dependent upon the application thereto of a signal from the non-corresponding switching stage.

9. A counter having, in combination, three serially connected switching stages, a fourth switching stage to which signal impulses-to-be-counted may be fed, a gating system connected with the fourth switching stage to trigger the three serially connected switching stages through the gating system, the gating system comprising an electrically operated gating device connected with an "and" circuit being responsive to output signals applied thereto from each of the three serially connected switching stages.

10. A counter having, in combination, three serially connected switching stages, a fourth switching stage to which signal impulses-to-be-counted may be fed, a gating system connected with the fourth switching stage to trigger the three serially connected switching stages through the gating system, the gating system comprising an electrically operated gating device connected with an "or" circuit being responsive to output signals applied thereto from each of the three serially connected switching stages.

11. A decade counter having, in combination, four serially connected switching stages, the serial connection between the first and second stages including a first gating circuit connected to be closed for a predetermined output from the second, third and fourth stages, and a second gating circuit connected between the first and fourth stages to open when the first gating circuit closes and to close when the first gating circuit is open.

12. A signal-impulse decade counter having, in combination, four serially connected bistable switching stages, the serial connection between the first and second stages including a gating circuit connected also with the third and fourth stages to be actuated for a predetermined output from the second, third and fourth stages at the time of the application to the gating circuit of an output from the second switching stage, which output is effected by the application of a signal impulse from the first stage to the second stage through the gating circuit.

13. A signal-impulse decade counter having, in combination, four serially connected switching stages, a gating circuit connected between the first and fourth stages and connected also with the second and third stages to be actuated for a predetermined output from the second, third and fourth stages at the time of the application to the gating circuit of an output from the fourth switching stage, which output is effected by the application of a signal impulse from the first stage to the fourth stage through the gating circuit.

14. A signal-impulse decade counter having, in combination, four serially connected switching stages, the serial connection between the first and second stages including a first gating circuit connected also with the third and fourth stages to be actuated for a predetermined output from the second, third and fourth stages at the time of the application to the first gating circuit of an output from the second switching stage, which output is effected by the application of a signal impulse from the first stage to the second stage through the first gating circuit, and a second gating circuit connected between the first and fourth stages and connected also with the second and third stages to be actuated for a predetermined output from the second, third and fourth stages at the time of the application to the second gating circuit of an output from the fourth switching stage, which output is effected by the application of a signal impulse from the first stage to the fourth stage through the second gating circuit.

15. A counter as claimed in claim 14 and in which one of the gating circuits comprises an electrically operated gate device controlled by an "and" circuit connected with the second, third and fourth stages.

16. A counter as claimed in claim 14 and in which one of the gating circuits comprises an electrically operated gate device controlled by an "or" circuit connected with the second, third and fourth stages.

17. A counter as claimed in claim 14 and in which the first and second gating circuits are complementarily operated.

18. A counter as claimed in claim 14 and in which the said connections of the first and second gating circuits with the second, third and fourth switching stages are respectively with complementary outputs thereof.

19. A counter as claimed in claim 14 and in which the first gating circuit comprises an electrically operative gate device connected between the output of the first stage and the input of the second stage, and a coincidence circuit connected between the outputs of the second, third and fourth stages and the gate device.

20. A counter as claimed in claim 14 and in which the second gating circuit comprises an electrically operative gate device connected between the output of the first stage and the input of the fourth stage, and a coincidence circuit connected between the outputs of the second, third and fourth stages and the gate device.

References Cited in the file of this patent

UNITED STATES PATENTS 3,078,417 Nick ---------------- Feb. 19, 1963

OTHER REFERENCES

Arithmetic Operation in Digital Computers, by Richards, pages 203 and 204, Van Nostrand Co. Inc., 1955.